Feb. 18, 1947. J. A. PORTER Re. 22,843
CONVEYER
Original Filed Nov. 9, 1944
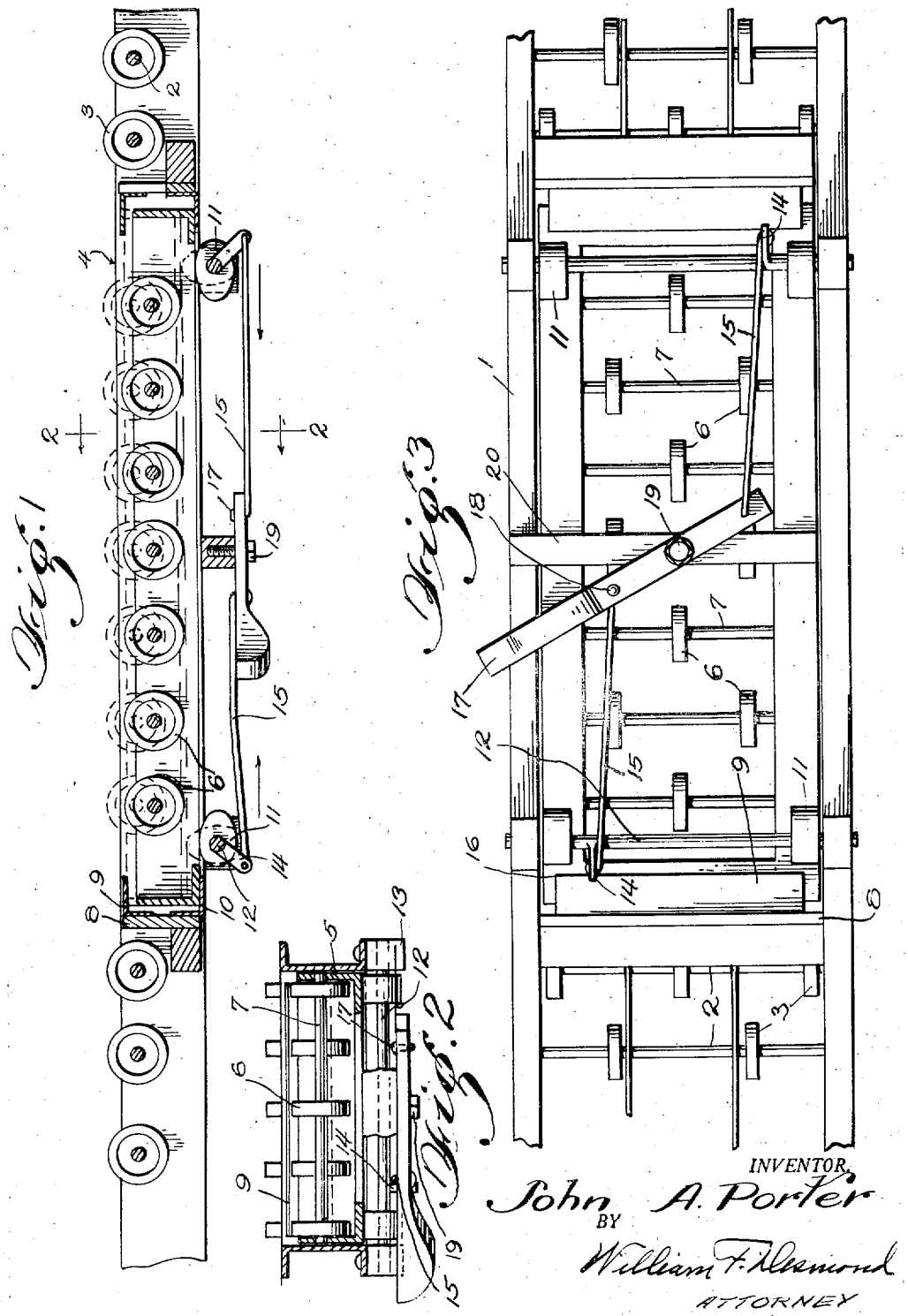
INVENTOR,
John A. Porter
BY
William F. Ellsmond
ATTORNEY Reissued Feb. 18, 1947

Re. 22,843

UNITED STATES PATENT OFFICE 22,843

CONVEYER

John A. Porter, San Antonio, Tex.

Original No. 2,388,283, dated November 6, 1945, Serial No. 562,640, November 9, 1944. Application for reissue September 16, 1946, Serial No. 697,170

5 Claims. (Cl. 193—35)

(Granted under the act of March 3, 1883, as amended April 30, 1928; 370 O. G. 757)

The invention described herein, if patented may be manufactured and used by or for the Government for governmental purposes, without the payment to me of any royalty thereon.

This invention relates to means for moving a load from one location to another, and particularly to a conveyer so constructed as to control the movement of the load traveling thereon.

More specifically, the invention is directed to a roller type conveyer provided with means to stop or arrest the movement of the load in an easy and simple manner.

It is frequently necessary to interrupt the movement of the load traveling on a conveyer for numerous reasons. I realize that arresting devices have heretofore been employed to stop the travel of the load at various locations in the conveyer system. Perhaps one of the most widely used arrangements has been a braking means which is projected into the path of the load to stop its forward progress. Manifestly, this type of arresting member is subjected to severe shock during the braking operation, and, as a consequence is easily broken or damaged requiring either replacement or repair. Other types of braking units have been devised, but they are relatively complex both in construction and operation, and the cost of manufacture is too great to permit their widespread employment.

To overcome the disadvantages of the prior art is a primary object of this invention.

An object of this invention is to provide an arresting device for roller conveyers which will stop the load in the operative position, and yet will not interfere with its forward movement when the arresting device is in the inoperative position.

Another object of the present invention is to provide a stop section in a roller conveyer which has the movement from a position where its rollers are below the plane of the other rollers of the conveyer to arrest the forward movement of the load, to a position where the rollers will be in the same plane as the other rollers to effect a continuous load moving surface.

Yet another object of this invention is to provide an arresting section for conveyers which is simple in structure and operation, and which can be easily and cheaply manufactured.

To accomplish the above and other objects, this invention embraces the idea of incorporating in a roller conveyer a separate section capable of limited vertical movement from an operative to an inoperative position. The section is lowered through mechanical linkage to a position where its rollers lie below the plane of the other rollers of the conveyer, and, also projected to a position where the rollers will be in the same plane as the other rollers thereby providing a continuous conveying surface.

With the foregoing and other advantageous objects in view, the present invention consists in the construction, combination and arrangement of elements as will be more fully hereinafter set forth as shown in the attached drawing and finally enumerated in the attached claims.

Attention is invited to the accompanying drawing forming a part of this specification in which like reference numerals designate the same or similar parts throughout the several views in which:

Figure 1 is a longitudinal sectional view of a roller conveyer having included therein my novel movement arresting section.

Figure 2 is a transverse sectional view taken along the line 2—2 of Figure 1 looking in the direction of the arrows.

Figure 3 is a bottom view of the construction shown in Figure 1.

As shown in Figure 1, the conveyer comprises parallel spaced side rails 1 and shafts 2 carrying rollers 3 are conveniently journaled in the side rails. My novel movement arresting section, indicated generally 4, may be located at any suitable point in the conveying apparatus, and preferably is adjacent each distribution point. In Figure 2 it will be noted that the section 4 comprises side walls 5 of angle section, and rollers 6 are mounted on shafts 7 whose outer ends are rotatably mounted in the side walls 5. Suitably secured to transverse cross braces 8 for the conveyer at the upper and lower ends thereof are angle brackets 9 and 10 respectively. The lower edge of each side wall 5 is adapted to contact the bracket 10 thereby limiting the downward movement of the rollers 6, and as will be described in more detail, the upward movement of the stop section 4 will be arrested when the side walls engage the flange of the upper bracket 9.

To raise or lower the rollers 6, a pair of cam surfaces 11 are located adjacent each end of the stop section 4. The cams are in continuous contact with the horizontal flange of each side wall and are carried by a shaft 12, each end of which is journaled in a bearing 13 attached to the side rails 1. An arm 14 is fixed to each shaft 12 and one end of a link 15 is connected to the end of the arm as shown at 16. The other or free end of the link 15 is secured to an operating lever 17 as designated by the numeral 18. The lever 17 is pivotally secured by means of a screw or the like 19 to a transversally extending strap or brace 20, which is fixed at each end to the side rails.

If the operator desires to lower the section 4 so that the rollers 6 will assume the position shown by the full lines in Figure 1, the lever 17 is turned to rotate each cam from its high point (shown by broken lines) to its low point. In this position the side walls 5 of the section 4 will rest on the horizontal flange of the lower brackets 10 and the periphery of each roller 6 will be below the upper edge of the side rails 1. Obviously, any load moving along the conveyer will be stopped before it can travel the length of the section 4.

It will further be appreciated that the box or crate, etc., is resting directly on the side rails and it is possible to either close or open the crate readily and quickly. This arrangement permits the invention to be employed in assembly or production lines where such operations are necessary.

To elevate the stop section, the lever 17 is rotated in the opposite direction thereby moving the cams 11 from their low point to their high point position. This movement of the cams will in turn raise the section 4 until the side walls thereof contact the flange of the upper brackets 9. At this point the rollers 6 will be in the position shown by the broken lines and all the rollers of the conveyer will be in the same plane, thus providing a continuous load moving surface.

By virtue of the foregoing description, I have devised a relatively simple movement arresting section for conveyers both in construction and operation. The device comprises few essential elements and it is apparent that the cost of manufacture is very reasonable and the replacement or repair of damaged parts can be readily accomplished.

It will be fully understood that the foregoing description and accompanying drawing cover only the general and preferred embodiment of the invention and that various changes in construction, proportion and arrangement of the elements may be made by those skilled in the art without departing from the spirit and scope of the invention as set forth in the appended claims.

I claim:

1. A conveyer comprising a pair of fixed, elongated, parallel, spaced side rails, a plurality of rollers supported between said side rails, cross braces disposed between said side rails, a movable conveyer section disposed between two of said cross braces and said spaced side rails, a plurality of rollers carried by said movable conveyer section, means to lower said movable section so that the plane of its rollers will be below the plane of the rollers carried by the side rails, and means connected to the two cross braces between which the movable conveyer section is disposed to limit the vertical movement of the movable conveyer section.

2. A conveyer comprising a pair of fixed elongated, parallel, spaced side rails; a plurality of rollers supported between said side rails; cross braces disposed between said side rails; a rectangular movable conveyer section disposed between two of said cross braces and said spaced side rails; a plurality of rollers carried by said movable conveyer section; cams on which said movable section is normally supported, one cam being located adjacent each of the four corners of said rectangular movable section; shafts on which said cams are fixed, said shafts being rotatably mounted on the fixed side rails; means for actuating said cams to lower said movable section so that the plane of its rollers will be below the plane of the rollers carried by the side rails, said means comprising a transversely extending strap connected to said side rails beneath said movable section and intermediate its ends, an operating lever pivotally connected thereto intermediate its ends, and linkage means connecting said operating lever to said cam shafts; and means connected to the two cross braces between which the movable conveyer section is disposed to limit the vertical movement of the movable conveyer section.

3. A conveyer comprising a plurality of rollers, supporting means for said rollers, said supporting means comprising a pair of spaced side rails, a movable conveyer section disposed between said spaced side rails, a plurality of rollers carried by said movable conveyer section in a plane parallel to that of said first-named rollers, means to lower said movable section so that the plane of its rollers will be below the plane of the rollers supported by the side rails and below the plane of said side rails, so as to deposit on said side rails a load of a width exceeding the distance between said rails, and means to limit the vertical movement of the movable conveyer section.

4. A conveyer comprising a plurality of rollers, supporting means for said rollers, said supporting means comprising a pair of spaced side rails, a movable conveyer section disposed between said spaced side rails, a plurality of rollers carried by said movable conveyer section, means to lower said movable section so that the plane of its rollers will be below the plane of the rollers supported by the side rails and below the plane of said side rails, so as to deposit on said side rails a load of a width exceeding the distance between said rails, and means connected to said supporting means to limit the vertical movement of the movable conveyer section.

5. A conveyer comprising a plurality of load conveying rollers, supporting means for said rollers, said supporting means comprising a pair of spaced side rails, a movable conveyer section disposed between said spaced side rails, a plurality of rollers carried by said movable conveyer section, means to lower said movable section so that the plane of its rollers will be below the plane of the rollers supported by the side rails and below the plane of said side rails, so as to deposit on said side rails a load of a width exceeding the distance between said rails, and means to limit the vertical movement of the movable conveyer section.

JOHN A. PORTER.

REFERENCES CITED

The following references are of record in the file of this patent:

UNITED STATES PATENTS

| Number | Name | Date |
|---|---|---|
| 1,694,591 | Grady | Dec. 11, 1928 |
| 2,267,605 | Drake | Dec. 23, 1941 |

FOREIGN PATENTS

| Number | Country | Date |
|---|---|---|
| 340,439 | Great Britain | Jan. 1, 1931 |